US008447808B2

(12) United States Patent
Acharya et al.

(10) Patent No.: US 8,447,808 B2
(45) Date of Patent: May 21, 2013

(54) VIRTUAL PRESENCE SERVER

(75) Inventors: Arup Acharya, Nanuet, NY (US);
Nilanjan Banerjee, West Bengal (IN);
Dipanjan Chakraborty, Kolkata (IN);
Koustuv Dasgupta, New Delhi (IN);
Archan Misra, Bridgewater, NJ (US);
Xiping Wang, Scarsdale, NY (US);
Charles P. Wright, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 12/233,795

(22) Filed: Sep. 19, 2008

(65) Prior Publication Data

US 2010/0077018 A1    Mar. 25, 2010

(51) Int. Cl.
*G06F 15/16* (2006.01)
*G06F 15/173* (2006.01)

(52) U.S. Cl.
USPC ............................ 709/204; 709/203; 709/224

(58) Field of Classification Search
USPC ................................................. 709/203, 204
See application file for complete search history.

(56) References Cited

U.S. PATENT DOCUMENTS

| | | | |
|---|---|---|---|
| 6,148,328 A | 11/2000 | Cuomo et al. | |
| 6,651,050 B2 | 11/2003 | Shafrir et al. | |
| 6,898,565 B2 | 5/2005 | Bubb | |
| 7,003,522 B1 * | 2/2006 | Reynar et al. | 707/736 |
| 7,099,915 B1 * | 8/2006 | Tenereillo et al. | 709/203 |
| 7,170,991 B2 * | 1/2007 | Shaffer et al. | 379/265.02 |
| 7,243,149 B2 | 7/2007 | Kelley et al. | |
| 7,302,270 B1 * | 11/2007 | Day | 455/456.1 |
| 7,340,533 B2 * | 3/2008 | Murtza et al. | 709/242 |
| 7,353,295 B1 * | 4/2008 | Crow et al. | 709/245 |

(Continued)

FOREIGN PATENT DOCUMENTS

| | | | |
|---|---|---|---|
| JP | 2004-072485 | * | 4/2004 |
| JP | 2004-348680 | * | 9/2004 |
| JP | 2006333446 A | | 12/2006 |
| WO | WO 2008/041830 A1 | * | 4/2008 |

OTHER PUBLICATIONS

Bergman et al Script-based Approach to Distributed Presence Aggregation, International Conference on Wireless Networks, Communications and Mobile Computing (2005) pp. 1168-1174.*

(Continued)

*Primary Examiner* — Bharat N Barot
*Assistant Examiner* — Robert Shaw
(74) *Attorney, Agent, or Firm* — Preston J. Young; Ryan, Mason & Lewis, LLP (57) ABSTRACT

Techniques are disclosed for generating and managing presentities in accordance with a virtual presence server. By way of example, a method for requesting information from at least one server comprises the following steps. A client request, which expresses a request that can not be satisfied by a single existing presentity, is obtained at an intermediate server, wherein the intermediate server operates as a virtual presence server. The virtual presence server (i.e., intermediate server) creates a set of software objects for a virtual presentity, the set of objects embodying logic to combine presence information from one or more of existing presentities and external information sources, in accordance with at least one existing presence server. The virtual presence server creates an association between the request of the client and the created virtual presentity that allows the presence information to be propagated back to the client.

20 Claims, 5 Drawing Sheets

U.S. PATENT DOCUMENTS

| | | | |
|---|---|---|---|
| 7,814,096 B1* | 10/2010 | Roy | 707/721 |
| 7,950,026 B1* | 5/2011 | Urbach | 719/329 |
| 2003/0037113 A1* | 2/2003 | Petrovykh | 709/205 |
| 2003/0046244 A1* | 3/2003 | Shear et al. | 705/52 |
| 2003/0093462 A1* | 5/2003 | Koskelainen et al. | 709/203 |
| 2003/0217098 A1 | 11/2003 | Bobde et al. | |
| 2004/0002967 A1* | 1/2004 | Rosenblum et al. | 707/3 |
| 2004/0137887 A1* | 7/2004 | Niemi | 455/416 |
| 2004/0153506 A1* | 8/2004 | Ito et al. | 709/204 |
| 2004/0161090 A1* | 8/2004 | Digate et al. | 379/202.01 |
| 2004/0177134 A1* | 9/2004 | Lonnfors et al. | 709/220 |
| 2004/0260749 A1* | 12/2004 | Trossen et al. | 709/200 |
| 2005/0102389 A1* | 5/2005 | Liscano et al. | 709/224 |
| 2005/0175021 A1 | 8/2005 | Ozugur et al. | |
| 2005/0216565 A1* | 9/2005 | Ito et al. | 709/224 |
| 2005/0216848 A1* | 9/2005 | Thompson et al. | 715/753 |
| 2005/0228895 A1* | 10/2005 | Karunamurthy et al. | 709/229 |
| 2005/0233776 A1* | 10/2005 | Allen et al. | 455/567 |
| 2005/0235038 A1 | 10/2005 | Donatella et al. | |
| 2005/0262198 A1* | 11/2005 | Leppanen et al. | 709/204 |
| 2005/0289097 A1* | 12/2005 | Trossen et al. | 707/1 |
| 2006/0047782 A1* | 3/2006 | Niemi | 709/220 |
| 2006/0167978 A1 | 7/2006 | Ozugur et al. | |
| 2006/0173936 A1* | 8/2006 | Castro et al. | 707/205 |
| 2006/0195587 A1* | 8/2006 | Cadiz et al. | 709/227 |
| 2006/0252444 A1* | 11/2006 | Ozugur | 455/519 |
| 2006/0253593 A1* | 11/2006 | Jachner | 709/227 |
| 2006/0288099 A1* | 12/2006 | Jefferson et al. | 709/224 |
| 2007/0033278 A1* | 2/2007 | Kelley et al. | 709/224 |
| 2007/0038723 A1 | 2/2007 | Gourraud | |
| 2007/0043731 A1* | 2/2007 | Wu et al. | 707/10 |
| 2007/0055577 A1 | 3/2007 | Ashton | |
| 2007/0124158 A1* | 5/2007 | Kakuta et al. | 705/1 |
| 2007/0168420 A1* | 7/2007 | Morris | 709/204 |
| 2007/0258576 A1* | 11/2007 | Klein et al. | 379/265.02 |
| 2007/0266076 A1* | 11/2007 | Cox et al. | 709/203 |
| 2007/0274489 A1* | 11/2007 | Yamamura et al. | 379/201.1 |
| 2007/0288421 A1* | 12/2007 | Chakrabarti et al. | 707/1 |
| 2008/0010301 A1* | 1/2008 | Tian et al. | 707/10 |
| 2008/0019300 A1* | 1/2008 | Perzy et al. | 370/328 |
| 2008/0077696 A1* | 3/2008 | Nguyen et al. | 709/229 |
| 2008/0108332 A1 | 5/2008 | Tian et al. | |
| 2008/0120409 A1 | 5/2008 | Sun et al. | |
| 2008/0125157 A1 | 5/2008 | Zhang | |
| 2008/0133644 A1* | 6/2008 | Garcia-Martin et al. | 709/202 |
| 2008/0137531 A1 | 6/2008 | Tal-Aviv et al. | |
| 2008/0155476 A1 | 6/2008 | Forbes et al. | |
| 2008/0162637 A1* | 7/2008 | Adamczyk et al. | 709/204 |
| 2008/0183866 A1* | 7/2008 | Maeda et al. | 709/224 |
| 2008/0249997 A1* | 10/2008 | Sun et al. | 707/3 |
| 2008/0285540 A1* | 11/2008 | Burckart et al. | 370/351 |
| 2010/0071053 A1* | 3/2010 | Ansari et al. | 726/12 |

OTHER PUBLICATIONS

Gehlot & Hayrapetyan, A Formalized and Validated Executable Model of the (Mar. 23-24, 2007) pp. 185-190.*

Roach, "Session Initiation Protocol (SIP)-Specific Event Notification" RFC 3265 (Jun. 2002).*

Rosenberg, "A Presence Event Package for the Session Initiation Protocol (SIP)", RFC 3856 (Aug. 2004).*

Roach et al, A Session Initiation Protocol (SIP) Event Notification Extension for Resource Lists, RFC 4662 (Aug. 2006).*

Day et al A Model for Presence and Instant Messaging, RFC 2778, (Feb. 2000).*

Lonforrs et al., "Publication of Partial Presence Information" IEFT Draft, Feb. 2004 http://www.ietf.org/internet-drafts/draft-lonnfors-simple-partial-publish-00.txt.*

H Schulzrinne et al, RPID Rich Presence Extensions to the PresenceInformation Data Format (PIDF), RFC 4480, IETF, (Jul. 2006).*

RFC 4480 RPID Rich Presence Extensions to(PIDF), IETF, (Jul. 2006).*

RFC 4662—"SIP Event Notification Extension for Resource Lists", IETF (Aug. 2006).*

Han et al, "A Study on SIP-based Instant Message and Presence", ICACT2007 (Feb. 12-14, 2007) pp. 1298-1301.*

Belinsky et al, PASTA: Deriving Rich Presence for Converged Telecommunications Network Applications, COMSWARE2007, IEEE, (Jan. 2007), p. 1-12.*

RFC 3863—"PIDF", IETF (Aug. 2004).*

RFC 4480 RPID, IETF, (Jul. 2006).*

RFC 3265—"SIP-Specific Event Notification", IETF, (Jun. 2002).*

RFC 3856—"A Presence Event Package for SIP", IETF (Aug. 2004).*

RFC 4662—"SIP Event Notification Extension for Resource Lists", IETF (Aug. 2006).*

RFC 4661—(XML)-Based Format for Event Notification Filtering (Sep. 2006).*

RFC 4479—A Data Model for Presence.*

S. O'Neill et al., "Add SIP to Your Contact Center and Create a Breakthrough Customer Experience," Nortel Networks, White Paper, Mar. 2006, 8 pages.

N. Banerjee et al., "Peer-to-Peer Instant Messaging and Presence Services Over Wireless Ad Hoc Networks," IBM Research Report, RC23289, Computer Science, Aug. 2004, pp. 1-7.

M. Day et al., "A Model for Presence and Instant Messaging," Network Working Group, RFC 2778, Feb. 2000, 14 pages.

O. Jorns et al., "A Privacy Enhancing Mechanism based on Pseudonyms for Identity Protection in Location-Based Services," Australian Computer Society, Proceedings of the Fifth Australasian Symposium on ACSW frontiers, 2007, pp. 133-142, vol. 68.

V. Gehlot et al., "A Formalized and Validated Executable Model of the SIP-Based Presence Protocol for Mobile Applications," ACMSE, Mar. 2007, pp. 185-190, North Carolina.

L. Bartram et al., "Designing Portable Collaborative Networks," Colligo Networks, ACMQUEUE, May 2003, pp. 41-49, vol. 1, No. 3.

E. Belinsky et al., "PASTA: Deriving Rich Presence for Converged Telecommunications Network Applications," IEEE, Comsware, 2007, 12 pages.

J. Rosenberg et al., "SIP: Session Initiation Protocol," RFC 3261, IETF Standards Track, Jun. 2002, pp. 1-269.

J. Rosenberg et al., A Presence Event Package for the Session Initiation Protocol (SIP), RFC 3856, IETF Standards Track, Aug. 2004, pp. 1-27.

J. Rosenberg, "Extensible Markup Language (XML) Formats for Representing Resource Lists," RFC 4826, Network Working Group, Standards Track, May 2007, pp. 1-31.

A.B. Roach et al., "A Session Initiation Protocol (SIP) Event Notification Extension for Resource Lists," RFC 4662, Network Working Group, Standards Track, Aug. 2006, pp. 1-39.

U.S. Appl. No. 11/954,141 filed in the name of W.F. Jerome et al. on Dec. 11, 2007 and entitled "Methods and Apparatus for Dynamic Generation and Notification of Virtual Presentities for Presence-Based Awareness."

* cited by examiner

VIRTUAL PRESENCE SERVER

FIELD OF THE INVENTION

The present invention relates to managing the dynamic content of entities identified by presence information (i.e., presentities) in a communications network that includes publishers and subscribers and, more particularly, to techniques for generating and managing the presence information derived from the presence content of multiple other presentities, by the use of a virtual presence server.

BACKGROUND OF THE INVENTION

Presence, broadly defined as the ability of a communications infrastructure to both track and disseminate a variety of dynamic attributes of individuals or objects, is rapidly becoming a key component of converged network applications in both telephone company provider and enterprise environments. Presence has rapidly evolved from its roots in instant messaging status (e.g., "buddy" status) to become a standard event mechanism for aggregating context about individuals, devices, and abstract entities (e.g., meetings, activities, and location coordinates).

Currently, the Session Initiation Protocol for Instant Messaging and Presence Leveraging Extensions (SIP/SIMPLE) based presence architecture has been standardized and is a key component in, for example, the 3rd Generation Partnership Project (3GPP) IP Multimedia Subsystem architecture (IMS).

It is known that applications often want to use a publish/subscribe model for data, as such a model provides timely information updates, and provides users with an interactive experience without the overhead of polling.

SIP provides an extension for event notification (see B. Roach, RFC 3265: Session Initiation Protocol (SIP)-Specific Event Notification, the disclosure of which is incorporated by reference herein) and publication (see A, Niemi, RFC 3903: Session Initiation Protocol (SIP) Extension for Event State Publication, the disclosure of which is incorporated by reference herein), collectively referred to as presence.

SUMMARY OF THE INVENTION

Principles of the invention provide techniques for generating and managing presentities that correspond to some computation performed over the presence status of other presentities or the dynamic information obtained from other external sources, in accordance with a virtual presence server.

By way of example, a method for requesting information from at least one server comprises the following steps. A client request, which expresses a request that can not be satisfied by a single existing presentity, is obtained at an intermediate server, wherein the intermediate server operates as a virtual presence server. The virtual presence server (i.e., intermediate server) creates a set of software objects for a virtual presentity, the set of objects embodying logic to combine presence information from one or more of existing presentities and external information sources, in accordance with at least one existing presence server. It is understood that in an illustrative embodiment, there may be a plurality of such existing presence servers. The virtual presence server creates an association between the request of the client and the created virtual presentity that allows the presence information to be propagated back to the client.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Illustrative embodiments of the present invention will be described below in the context of a SIP-based presence server environment; however, it is to be understood that principles of this invention are generally applicable to any presence-based system that employs a publish/subscribe model.

Also, while illustrative embodiments of the invention will be described herein in the context of a client/server environment (a "client" referring to a computing device that sends request to a "server," which is a computing device that processes the client request and, if appropriate, sends back a response), it is to be understood that principles of this invention are generally applicable to other computing device environments.

The term "presentity" as used herein is intended to be construed broadly so as to encompass, by way of example and without limitation, an entity identified by presence information (e.g., a screen name that identifies a human, device, or automated system) and that is associated with a unique resource identifier or indicator (e.g., a URI). The word is a combination of words "presence" and "entity" and was first introduced in by the Internet Engineering Task Force (IETF) in Request for Comments (RFC) 2778. As indicated above, a presentity may refer to a human, a computing device or some abstract object that can be represented by a collection of dynamic attributes. In the case of a human, for example, presence information describes availability and willingness of this human to communicate via set of communication services. For example, users of an instant messaging service are presentities and their presence information might be user status (e.g., online, offline, away, etc.). A presentity can also refer to a group of humans, for example a collection of customer service agents in a call center. This presentity may be considered available if there is at least one agent ready to accept a call. However, other definitions of presentity may apply.

The term "virtual presentity" as used herein is intended to be construed broadly so as to encompass, by way of example and without limitation, a presence entity that is created by the virtual presence server, or some external source, purely in response to some specified computing logic or query operating over other existing presenties, such that the attributes of the virtual presentity correspond to answers, either wholly or partially, to the specified computing logic. In contrast, 'non-virtual' or 'real' presentities correspond to presence entities that exist independently of any external query, e.g., a presentity for the user of a instant messaging service captures the state of the individual, independently of the queries or interests expressed by any other individual, device or computing system. The 'virtual presentity' may thus be viewed as a presence-based abstract view, corresponding to some computing logic, expressed over other presentities (both 'real' and 'virtual') or external data sources. Thus, it is to be understood that the virtual presence server is preferably a physical server that handles virtual presentities in the manner described herein.

In U.S. patent application Ser. No. 11/954,141, filed on Dec. 11, 2007, entitled "Methods and Apparatus for Dynamic Generation and Notification of Virtual Presentities for Presence-based Awareness," the disclosure of which is incorporated by reference herein, a proposal for virtual presence is described, where the SIP SUBSCRIBE carries the logic of the query (expressed in XML) in its body. The presence server is then responsible for instantiating the corresponding processing logic on an associated correlation engine, and for defining a unique URI to represent the outcome of the query. In this approach, the presence server needs to be upgraded to handle the dynamics of query processing and dynamic URI allocation.

While this approach in Ser. No. 11/954,141 is highly beneficial, illustrative embodiments of the present invention differ from the Ser. No. 11/954,141 approach in that the present embodiments do not require any modifications to the presence server to enable presence virtualization. That is, in the virtual presence server approach of the present invention, the presence server remains unmodified. Advantageously, all of the processing logic is maintained by the virtual presence server, which may utilize presence data from multiple underlying presence servers. Moreover, the approach in Ser. No. 11/954,141 associates a unique URI (virtual presentity) with each incoming query independently; there is thus no ability to share a common presentity (and its URI), either wholly or partially, across different queries. Consequently, the approach in Ser. No. 11/954,141 does not try to improve the efficiency of the correlation engine (where the computing logic for virtual presentity generation is embedded) by exploiting common parts of multiple queries. Also, the client query to the presence server must be expressed solely through the use of SIP messages.

In accordance with principles of the present invention, we propose to expose the dynamically-created presentity URI (dynamically created in response to a client query) as an externally visible URI (no different than the URIs of the regular presentities). Other client queries can then be expressed over a combination of such dynamic presentities and regular presentities.

Figure 1:
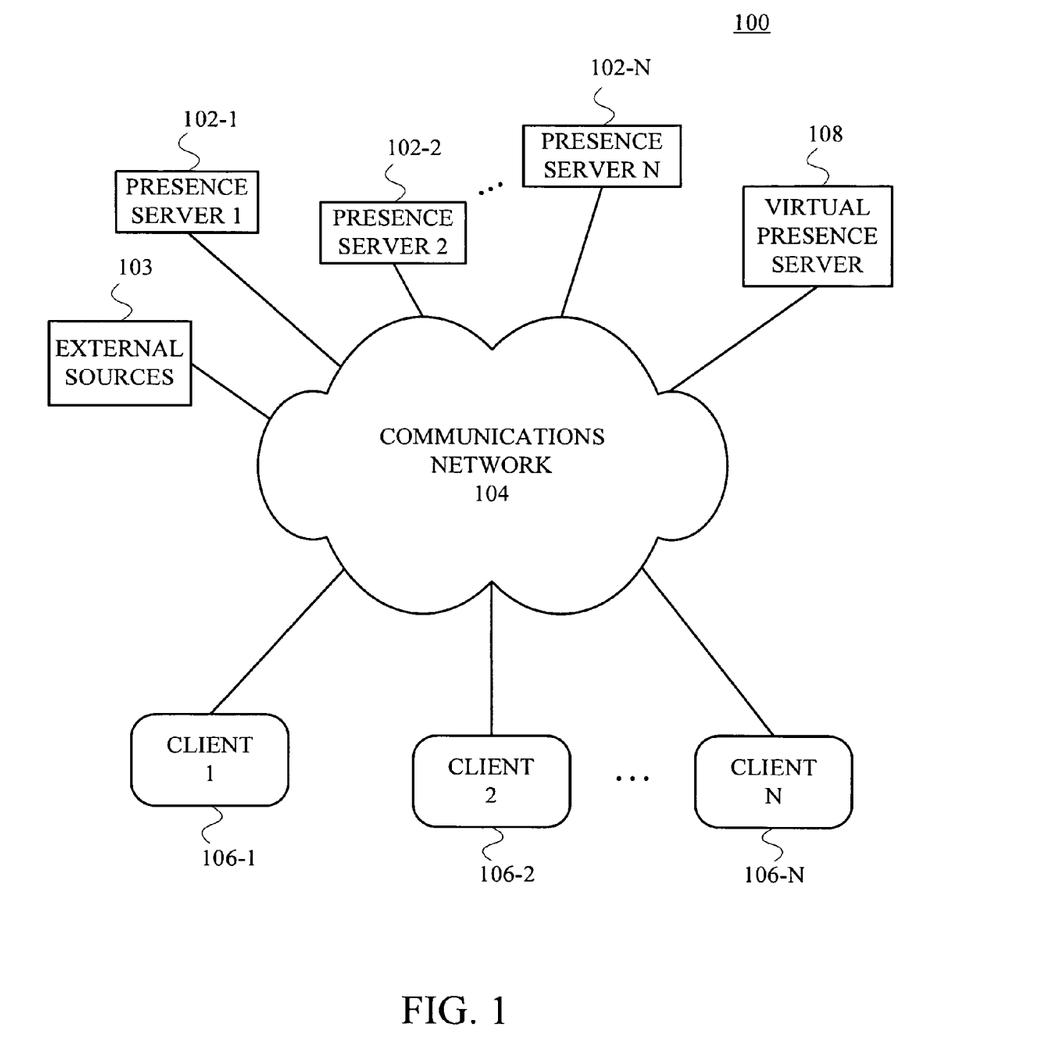
FIG. 1 is a diagram illustrating a system for managing presentities in a communications network using a virtual presence server, according to an embodiment of the present invention.

Referring initially to FIG. 1, a diagram illustrates a system for managing presentities in a communications network, according to an embodiment of the present invention. More particularly, system 100 illustrates an environment in which a publish/subscribe model using a virtual presence server may be carried out. As shown, multiple presence servers 102-1, . . . 102-N, external sources 103, multiple presence client devices (106-1, . . . 106-N), and a virtual presence server 108 are connected to a communications network 104. The clients and servers are operative to communicate with one another using one or more protocols, with one of these protocols being the Session Initiation Protocol or SIP. As will be explained below, the virtual presence server acts as an overlay over a set of presence servers.

In general, the devices may represent a publisher, a presentity, or a subscriber ("watcher"). For example, one device may be the personal computer of a watcher who subscribes to locate presentities in a particular geographic area. The watcher sends a subscription specifying geographic location information to a presence server. The presence server then informs the watcher of presentities that satisfy the subscription criteria. For example, one presentity, represented by a device, may be a person's cellphone that is transmitting global positioning information that satisfies the specified subscription criteria. Principles of the present invention introduce the notion of a virtual presence server (108) that operates between the client devices (106-1 through 106-N) and the regular presence servers (102-1 through 102-N).

More particularly, in accordance with illustrative embodiments and as will be described below in detail in the context of FIGS. 2 and 3, virtual presence server 108 is used to respond to SIP SUBSCRIBE requests from the client devices (106-1 through 106-N) by providing the clients a new virtual presence URI that the clients then subscribe to (via an existing presence server implementation, e.g., presence server 102-1). As part of the process for providing this virtual presence URI, the virtual presence server may create one or software objects representing a publishing client for the corresponding virtual presentity. The virtual presence server 108 (more precisely, the software objects acting as the publishing client for the created virtual presentity) then sends PUBLISH messages to the existing presence server 102-1 for the newly instantiated virtual presence URI. This architecture allows the virtual presence server 108 to provide event notification for dynamically created presentities in response to requests while leveraging the capabilities of the existing presence server, e.g., presence server 102-1. Note that the initial query from the client devices may not be restricted to only use SIP SUBSCRIBE messages; alternate forms of query submission (such as the use of browser-generated HTTP requests) are also permitted.

Figure 2:
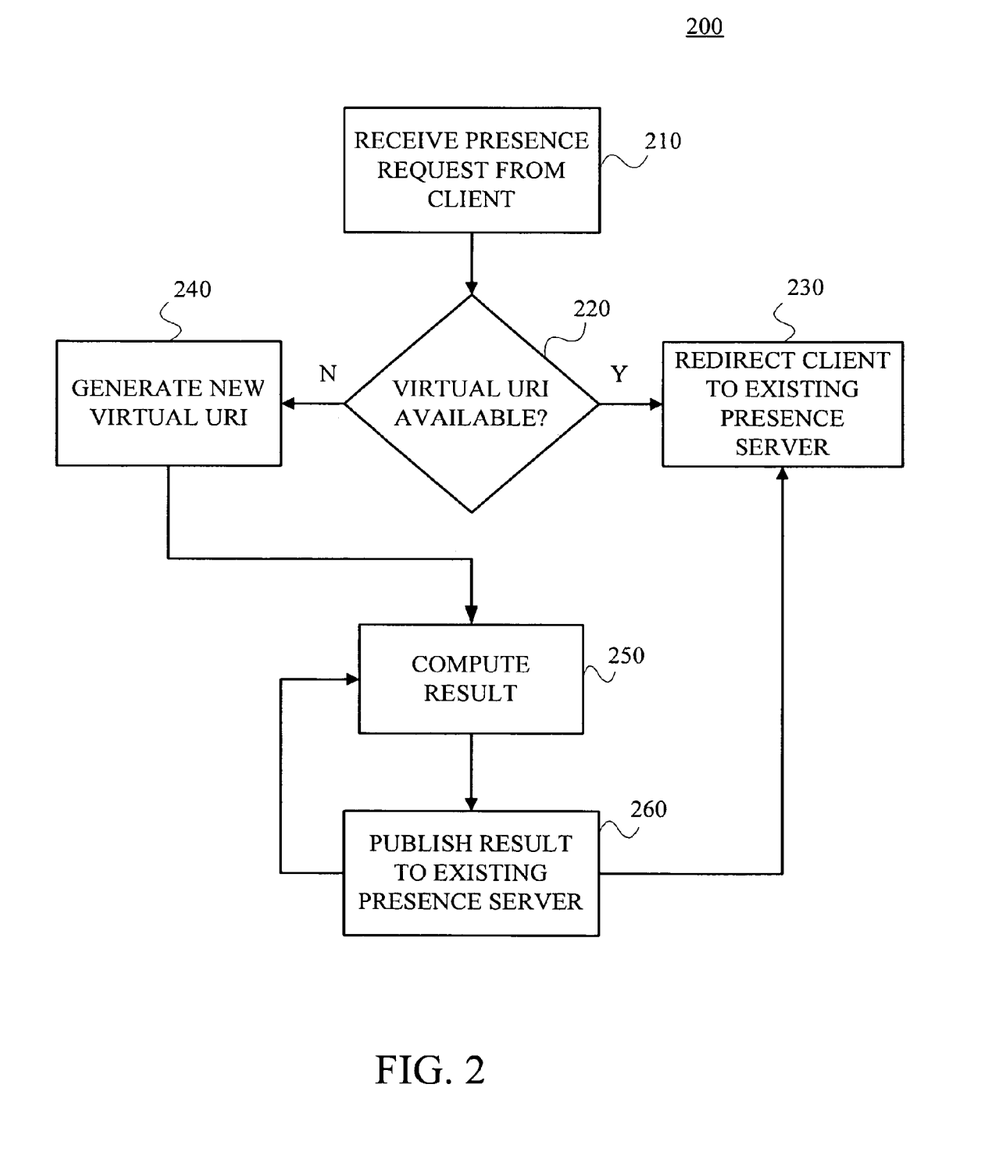
FIG. 2 is a diagram illustrating a methodology of generating a virtual presence uniform locator identifier, according to an embodiment of the present invention.

Illustrative embodiments create a presence management methodology 200 as shown in FIG. 2. In our architecture, a client submits a subscription request to a virtual presence server (step 210). Upon receipt of the request, the virtual presence server determines if a virtual URI already exists for this request (step 220); in effect, this would imply that the software objects acting as the publishing clients for the required virtual presentity have already been instantiated. If so, then the virtual presence server redirects the client to an existing presence server responsible for the virtual URI (step 230). If there is no virtual URI already available, then the virtual presence server must create one (step 240). After computing the result for the request (step 250), the software objects acting as the publishing clients for the corresponding virtual presentity publishes the result of the request to the virtual URI (step 260), and redirects the client to the virtual URI (step 230). The client in turn subscribes to this URI to obtain the result of the request. Additionally, the virtual presence server may continuously update the result by publishing it to the virtual presentity's URI. The existing presence server will notify the client of any updates and manage the required subscription state. If the URI or request that was submitted by the client should not be handled by the virtual presence server (e.g., because it is an unknown request, or based on a policy configuration), it may respond with a typical SIP error code;

or alternatively redirect such unknown or configured requests to another presence server (either another virtual or existing presence server).

Figure 3:
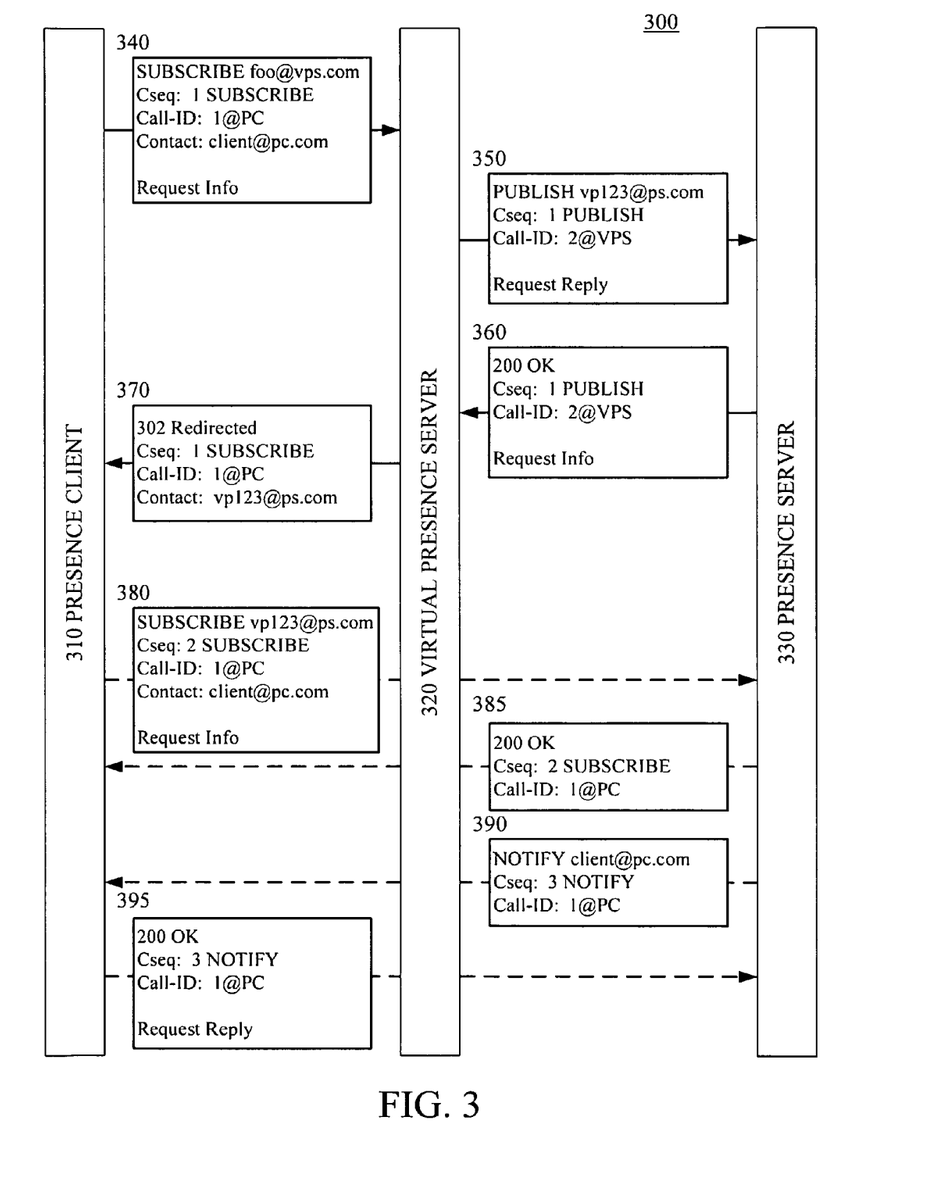
FIG. 3 is a diagram illustrating an illustrative message flow, according to an embodiment of the present invention.

Alternatively, rather than publishing the updated information to the existing presence server, the virtual presence server may redirect the client to a newly created URI that encodes the required function and parameters to execute the required logic An illustrative message flow 300 for virtualizing the SIP presence message flow is shown in FIG. 3. Three entities participate in the exchange: the presence client (310), the virtual presence server (320) and an existing presence server (330). In this example, we only show the most relevant header fields for clarity. Each message in the flow must also contain a variety of other headers for transaction matching, routing, and other basic SIP functionality.

The presence client (310) initiates the virtualized presence transaction by sending a SUBSCRIBE message (340) to the virtual presence server (320). The subscribe message encapsulates the information that the virtual presence server needs to service the request either in the SIP headers or message body. For example, the presence client may be an application that assists users in locating available experts. In this case, the virtualized presence request could consist of a query for Java experts in Hawthorne, N.Y.

To service a request, the virtual presence server:
i) generates a unique presence URI (this being the "virtual presence URI"), in this case vp123@ps.com,
ii) instantiates the software objects that are able to retrieve the necessary data from the underlying presentities, apply the specified computing logic to derive the required response to the query, and
iii) publishes the result of the query to the existing presence server (330) using a PUBLISH request (350).

Figure 4:
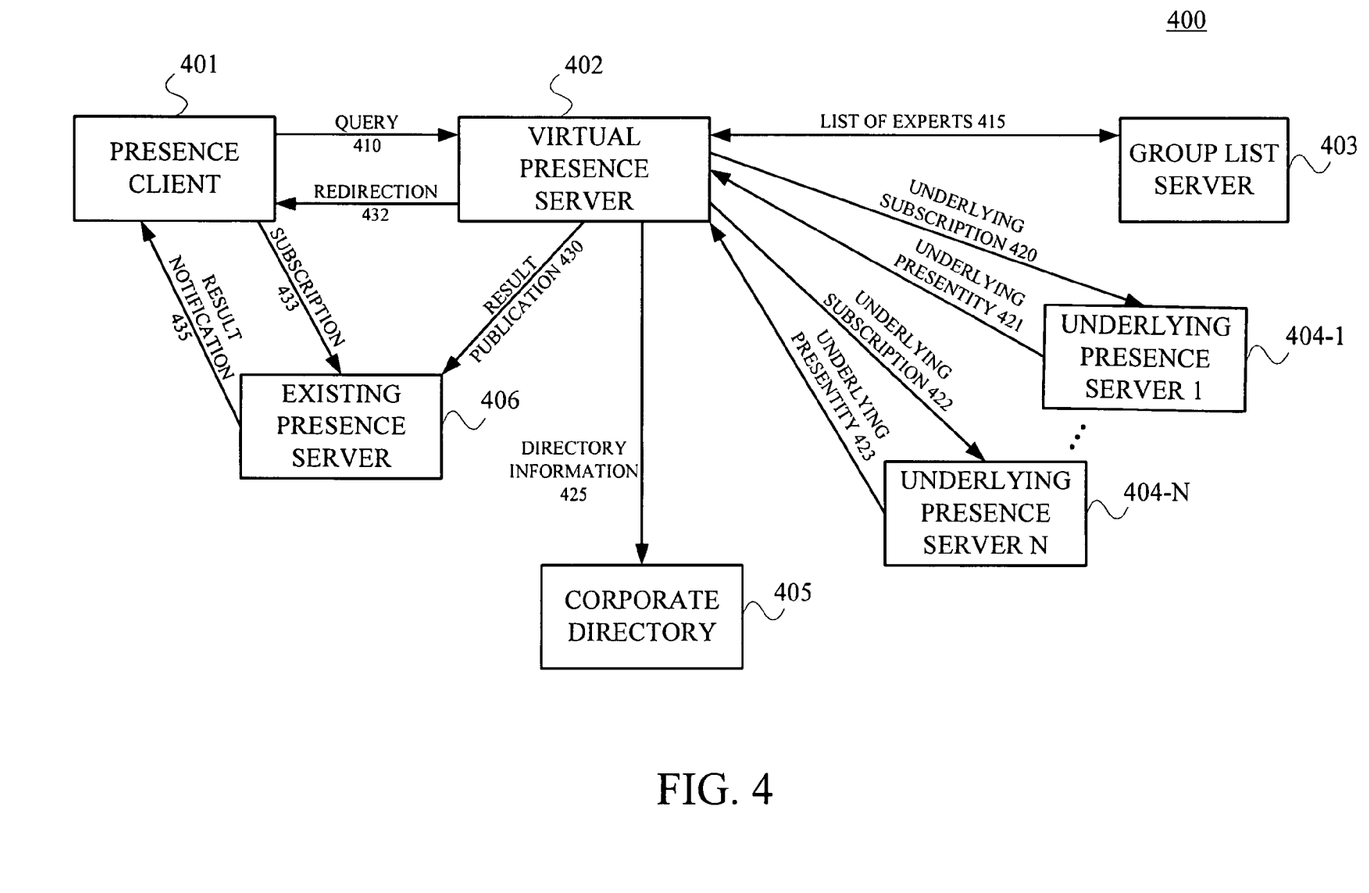
FIG. 4 is a diagram illustrating a system for managing presentities in a communications network using a virtual presence server, according to another embodiment of the present invention.

In practice, there may be intervening requests at any point, for example, the virtual presence server may need to establish subscriptions with one or more existing presence servers in order to complete the request. This would be needed, for example, when the query specification requires, as source data, the presence data from a set of existing presentities. In this case, the software objects acting as publish clients for the virtual presentity must also issue the necessary subscriptions to the presence server to obtain the required dynamic data. With reference to FIG. 4, in the example of a query (410) from a presence client (401) to locate Java experts, the actions performed by the virtual presence server (402) in step (ii) include processing logic steps such as:
(a) retrieving the list of potential experts (415) from a group list server (403);
(b) using an external non-presence-data source (e.g., directory information 425 in a corporate directory 405) to identify which of those experts are Java experts;
(c) subscribing (420, 422) to the underlying (i.e., real) presentities (421, 423) of the Java experts from one or more existing presence servers (404-1 through 404-N);
(d) determining which of those experts are available and have their location in the city of Hawthorne (again, according to directory information 425 available from corporate directory 405);
(e) and aggregating the available experts into an XML presence body (a virtual presentity).

The aggregated XML presence body would then be published (430) to an existing presence server (406) in step (iii).

Returning to reference to FIG. 3, after the virtual presence server sends the PUBLISH request (350), the existing presence server replies to the request with a successful reply (360). At this point the virtual presentity has been created, and the presence client (310) is notified by the virtual presence server (320) of the new presentity using a '302' redirection response (370). (This redirection is shown in FIG. 4 as 432.)

The client (310) creates a new SUBSCRIBE message (380) which is sent directly to the existing presence server (330). (This subscription is shown in FIG. 4 as 433. Dashed lines in FIG. 3 denote that flow for these messages does not need to go through the virtual presence server but can go directly between the existing presence server and the client. The existing presence server (330) responds to the subscription message with a successful response (385), and the reply that was generated by the virtual presence server (320) is sent to the client using a NOTIFY message (390). (This notification is shown in FIG. 4 as 435.) The exchange is completed by the presence client (310) acknowledging receipt of the NOTIFY with a 200 OK message (395).

Subsequent updates to the reply are published by the virtual presence server (320) to the existing presence server (330), using an identical sequence to the PUBLISH/OK transaction (350, 360). These updates are then pushed to the client (310) using a NOTIFY/200 exchange (390/395). In the example of locating Java experts, these further updates are caused by the changing availability or location of the experts. As the availability of the Java experts changes, the underlying presence servers send notifications to the software objects instantiated by virtual presence server acting as subscription clients. These software objects then recompute the set of available Java experts, and send a publication to the existing presence server. The existing presence server in turn sends a notification to the presence client with the updated list of Java experts.

In this example, the underlying presentities are located on existing underlying presence servers; however, a virtual presentities can also be constructed from one or more other virtual presentities in a hierarchical manner. As previously described, the virtual presentity 'available Java experts in Hawthorne' can be implemented by requesting underlying presence documents for each presentity. Alternatively, if a second virtual presentity exists for 'all available Java experts' the virtual presence server implementing the first query could subscribe to the second virtual presentity rather than all the underlying presentities and return only the Java experts in Hawthorne from the results of the second query. Conversely, the query 'all available Java experts' could be implemented by combining the results from one or more queries of the form 'available Java experts in location X.' Each of these hierarchical formulations of the processing logic provides advantages in different scenarios. Also note that although in this example, the virtual presentities form subsets or supersets of the virtual presentities that they are derived from; this is not a requirement of the invention. Furthermore, the virtual presentities that make up a query could be composed of other virtual presentities which are themselves composed of virtual presentities and so on, i.e., virtual presentities can be composed recursively.

Although in this example the messaging between the presence client, the virtual presence server, and the presence server makes use of only SIP signaling; the interaction between the presence client and the virtual presence server may utilize other protocols. For example, the presence client may submit requests to the virtual presence server using a web (HyperText Transport Protocol or HTTP) interface; the virtual presence server can then generate a URI (or re-use an existing one); publish information to an existing presence server; and return the newly generated URI to the presence client over the same HTTP connection. The client then subscribes to the presence server and URI that was provided by the virtual presence server. Clearly, any protocol may be used for this interaction between the presence client and virtual presence server.

Additionally, the virtual presence server (320) can use other methods to redirect the presence client's (310) request to the existing presence server (330). For example, the virtual presence server (320) may act as a SIP proxy, forwarding the modified request (now with the dynamic presentity URI) to the existing presence server (330) and optionally forwarding responses from the presence server (330) to the presence client (310).

Accordingly, as described herein in detail and illustrated in FIGS. 2 and 3, principles of the invention provide a method for a client to request information from a presence server in the following manner. A client (310) expresses a request that can not be satisfied by existing, pre-defined, standard operations over a single existing presentity. An intermediate virtual presence server (320) dynamically creates a virtual presentity that embodies logic to combine presence information from a set of existing presentities and external information sources. An association is created between the client's request and the virtual presentity (via the dynamically assigned URI that identifies the created virtual presentity) that allows the information to be propagated back to the client.

Furthermore, in one embodiment, for a client to receive information for a request that cannot directly be answered by an individual presence document residing on a presence server (330), the client sends its query for the information it needs to an intermediate virtual presence server. The intermediate virtual presence server instantiates the processing logic to create the necessary information and associates a dynamic presentity URI to represent this newly created information. The intermediate virtual presence server ensures that this newly created information is to be PUBLISHED as the presence state for this dynamic presentity URI to the presence server. The intermediate virtual presence server redirects the client to the dynamic presentity URI. The client then subscribes to this dynamic presentity URI and receives the presence state information for this newly created presentity from the existing presence server (330). It is to be appreciated that the answer to the request is continuously updated by the intermediate virtual presence server. Further, the virtual presence server may instantiate the processing logic by executing the appropriate logic directly. In this embodiment, the client is not necessarily re-directed to an existing presence server; rather, the virtual presence server itself also acts as a 'presence server', managing the URI of the virtual presentity. In this case, the client would be redirected (via the URI of the virtual presentity) back to the virtual presence server, which would be responsible for providing the computed attributes of the virtual presentity (the presence attributes of the virtual presentity may or may not be additionally published to the presence server). The virtual presence server may alternatively instantiate the processing logic by communicating it to another system which then publishes to the dynamic presentity. In this approach, the virtual presence server merely instantiates or activates, on a remote device, the software objects acting as publish clients for the newly created virtual presentity; the virtual presence server would then pass along the URI of the virtual presentity as a parameter of its instantiation request.

Still further, in another embodiment, for a client to receive information for a request that cannot directly be answered by an individual presence document residing on a presence server, the client (310) sends its query for the information it needs to the intermediate virtual presence server (320). The intermediate virtual presence server instantiates the processing logic to create the necessary information and associates a dynamic presentity URI to represent this newly created information. The intermediate virtual presence server ensures that this newly created information is to be PUBLISHED as the presence state for this dynamic presentity URI to the existing presence server 330). The intermediate virtual presence server proxies the original subscription request to the dynamic presentity URI.

Figure 5:
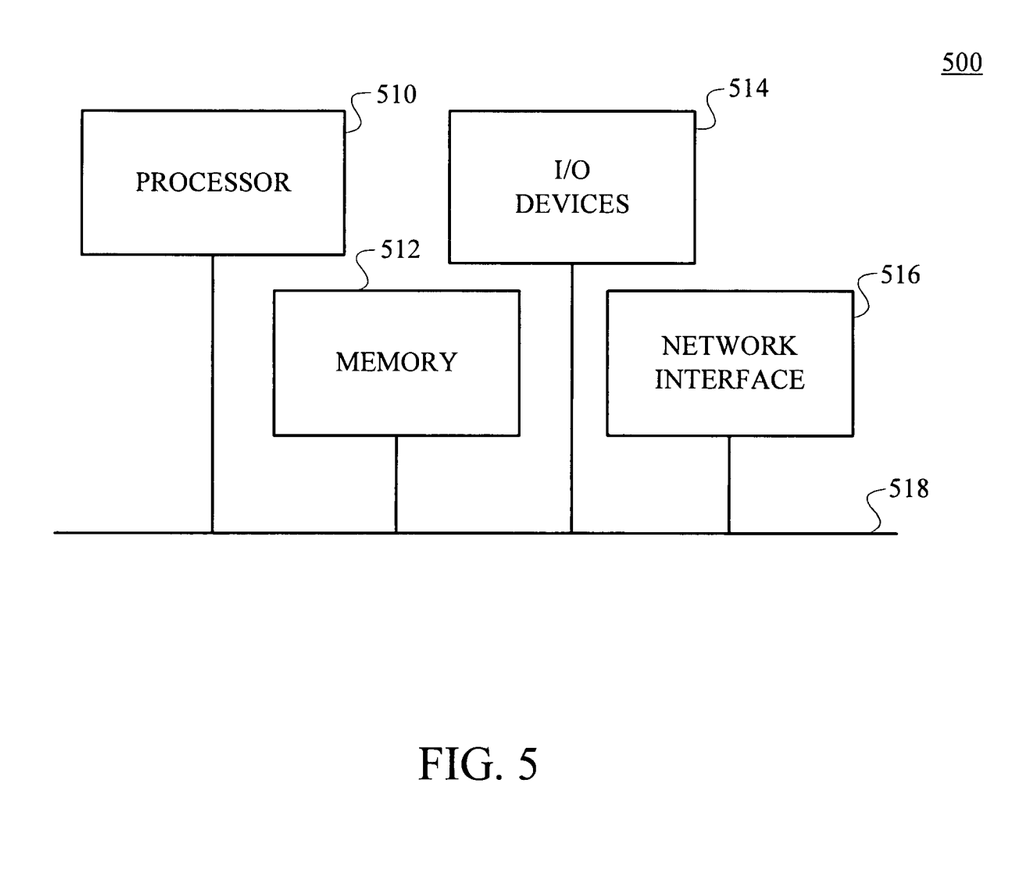
FIG. 5 is a diagram illustrating an illustrative implementation of a computing system in accordance with which one or more components/methodologies of the present invention may be implemented, according to an embodiment of the present invention.

Referring lastly to FIG. 5, an exemplary implementation 500 of a computing system in accordance with which one or more components/methodologies of the invention (e.g., components/methodologies described in the context of FIGS. 1-4) may be implemented, according to an embodiment of the present invention. For example, the exemplary implementation may represent the computing system used to implement a client device and/or any presence servers.

As shown, the techniques for managing entities identified by presence information in a communications network may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. It is understood that a memory device mentioned here is example of "computer readable storage medium," which may constitute an article of manufacture when software instructions or code for implementing techniques of the invention are stored for execution thereon.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Thus, as mentioned above, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of requesting information from at least one server, comprising the steps of:
 a virtual presence server receiving a client query requesting presence information, said client query comprising a plurality of different attributes whose attribute values must be retrieved from presence information obtained from a plurality of different existing presentities and external information sources, and whose attribute values are used to compute a response to the client query, wherein the virtual presence server is an intermediate server that operates between clients and existing presence servers;

the virtual presence server instantiating a set of software objects for creating a new virtual presentity, said set of software objects embodying logic to (i) retrieve presence information, which satisfies the plurality of different attributes of said client query, from the plurality of different existing presentities and external information sources, and to (ii) execute query compute logic on the attribute values to create information used to derive the response to the client query based on the retrieved presence information, said response to said client query being a new virtual presentity that is created by the virtual presence server;

the virtual presence server creating an association between the client query and the new virtual presentity that is created, wherein said association allows the retrieved presence information to be propagated back to the client;

associating a dynamic presentity uniform resource identifier (URI) to identify the new virtual presentity;

causing the new virtual presentity to be published as a presence state for the dynamic presentity URI to at least one existing presence server; and redirecting the client to the dynamic presentity URI such that the client subscribes to the dynamic presentity URI and receives presence state information for the new virtual presentity from the at least one existing presence server.

2. The method of claim 1, further comprising:
the virtual presence server determining if there already exists a virtual presentity with a query logic identical to the query logic of the client; and
if the query logic is identical, then returning the URI identifying the virtual presentity previously created.

3. The method of claim 1, wherein the virtual presence server instantiates the query compute logic for creating a virtual presentity by communicating the query compute logic to another system which then publishes computed attributes of the virtual presentity to the at least one existing presence server.

4. The method of claim 1, further comprising the virtual presence server periodically updating an answer to the client query.

5. The method of claim 1, wherein the virtual presence server further operates by:
associating a dynamic presentity uniform resource identifier (URI) to represent the new virtual presentity that is created;
causing the new virtual presentity to be published as a presence state for the dynamic presentity URI to at least one existing presence server; and
proxying the client request to the dynamic presentity URI.

6. The method of claim 1, wherein the virtual presence server instantiates the query compute logic for creating a virtual presentity by:
issuing at least one subscription request for a set of presentities to at least one existing presence server;
receiving notifications on dynamic attributes of the subscribed presentities; and
recomputing dynamic attributes of an associated presentity.

7. The method of claim 6, wherein issuing subscription requests further comprises the virtual presence server triggering a set of external publish agents to publish the presence status of the set of presentities to the at least one existing presence server.

8. The method of claim 1, wherein the virtual presence server further operates by:
associating a dynamic presentity uniform resource identifier (URI) to represent the new virtual presentity that is created; and
causing the new virtual presentity to be notified, along with the information of the dynamic presentity URI, to the client issuing the query.

9. The method of claim 1, wherein the step of instantiating a set of software objects for a virtual presentity further comprises the virtual presence server issuing a set of requests and creating dynamic presentities to support these requests, thereby recursively creating a hierarchy of virtual presentities.

10. Apparatus for requesting information from at least one server, the apparatus comprising:
a memory; and
a processor coupled to the memory and configured to:
receive a client query requesting presence information, said client query comprising a plurality of different attributes whose attribute values must be retrieved from presence information obtained from a plurality of different existing presentities and external information sources, and whose attribute values are used to compute a response to the client query, wherein the virtual presence server is an intermediate server that operates between clients and existing presence servers;
instantiate a set of software objects for creating a new virtual presentity, said set of software objects embodying logic to (i) retrieve presence information, which satisfies the plurality of different attributes of said client query, from the plurality of different existing presentities and external information sources, and to (ii) execute query compute logic on the attribute values to create information used to derive the response to the client query based on the retrieved presence information, said response to said client query being a new virtual presentity that is created by the virtual presence server;
create an association between the client query and the new virtual presentity that is created, wherein said association allows the retrieved presence information to be propagated back to the client;
associate a dynamic presentity uniform resource identifier (URI) to identify the new virtual presentity;
cause the new virtual presentity to be published as a presence state for the dynamic presentity URI to at least one existing presence server; and
redirect the client to the dynamic presentity URI such that the client subscribes to the dynamic presentity URI and receives presence state information for the new virtual presentity from the at least one existing presence server.

11. An article of manufacture for requesting information from at least one server, the article of manufacture comprising a computer system that implements the steps of:
a virtual presence server receiving a client query requesting presence information, said client query comprising a plurality of different attributes whose attribute values must be retrieved from presence information obtained from a plurality of different existing presentities and external information sources, and whose attribute values are used to compute a response to the client query, wherein the virtual presence server is an intermediate server that operates between clients and existing presence servers;

the virtual presence server instantiating a set of software objects for creating a new virtual presentity, said set of software objects embodying logic to (i) retrieve presence information, which satisfies the plurality of different attributes of said client query, from the plurality of different existing presentities and external information sources, and to (ii) execute query compute logic on the attribute values to create information used to derive the response to the client query based on the retrieved presence information, said response to said client query being a new virtual presentity that is created by the virtual presence server; the virtual presence server creating an association between the client query and the new virtual presentity that is created, wherein said association allows the retrieved presence information to be propagated back to the client;

the virtual presence server associating a dynamic presentity uniform resource identifier (URI) to identify the new virtual presentity;

the virtual presence server causing the new virtual presentity to be published as a presence state for the dynamic presentity URI to at least one existing presence server; and the virtual presence server redirecting the client to the dynamic presentity URI such that the client subscribes to the dynamic presentity URI and receives presence state information for the new virtual presentity from the at least one existing presence server.

12. A virtual presence server, comprising:
a memory; and
a processor coupled to the memory and configured to:
receive a client query requesting presence information, said client query comprising a plurality of different attributes whose attribute values must be retrieved from presence information obtained from a plurality of different existing presentities and external information sources, and whose attribute values are used to compute a response to the client query, wherein the virtual presence server is an intermediate server that operates between clients and existing presence servers;
instantiate a set of software objects for creating a new virtual presentity, said set of software objects embodying logic to (i) retrieve presence information, which satisfies the plurality of different attributes of said client query, from the plurality of different existing presentities and external information sources, and to (ii) execute query compute logic on the attribute values to create information used to derive the response to the client query based on the retrieved presence information, said response to said client query being a new virtual presentity that is created by the virtual presence server;
create an association between the client query and the new virtual presentity that is created, wherein said association allows the retrieved presence information to be propagated back to the client;
associate a dynamic presentity uniform resource identifier (URI) to identify the new virtual presentity;

cause the new virtual presentity to be published as a presence state for the dynamic presentity URI to at least one existing presence server; and
redirect the client to the dynamic presentity URI such that the client subscribes to the dynamic presentity URI and receives presence state information for the new virtual presentity from the at least one existing presence server.

13. The virtual presence server of claim 12, further comprising:
the virtual presence server determining if there already exists a virtual presentity with a query logic identical to the query logic of the client; and
if the query logic is identical, then returning the URI identifying the virtual presentity previously created.

14. The virtual presence server of claim 12, wherein the virtual presence server instantiates the query compute logic for creating a virtual presentity by communicating the query compute logic to another system which then publishes computed attributes of the virtual presentity to the at least one existing presence server.

15. The virtual presence server of claim, 12 further comprising the virtual presence server periodically updating an answer to the client query.

16. The virtual presence server of claim 12, wherein the virtual presence server further operates by:
associating a dynamic presentity uniform resource identifier (URI) to represent the new virtual presentity that is created;
causing the new virtual presentity to be published as a presence state for the dynamic presentity URI to at least one existing presence server; and
proxying the client request to the dynamic presentity URI.

17. The virtual presence server of claim 12, wherein the virtual presence server instantiates the query compute logic for creating a virtual presentity by:
issuing at least one subscription request for a set of presentities to at least one existing presence server;
receiving notifications on dynamic attributes of the subscribed presentities; and
recomputing dynamic attributes of an associated presentity.

18. The virtual presence server of claim 17, wherein issuing subscription requests further comprises the virtual presence server triggering a set of external publish agents to publish the presence status of the set of presentities to the at least one existing presence server.

19. The virtual presence server of claim 12, wherein the virtual presence server further operates by:
associating a dynamic presentity uniform resource identifier (URI) to represent the new virtual presentity that is created; and
causing the new virtual presentity to be notified, along with the information of the dynamic presentity URI, to the client issuing the query.

20. The virtual presence server of claim 12, wherein the step of instantiating a set of software objects for a virtual presentity further comprises the virtual presence server issuing a set of requests and creating dynamic presentities to support these requests, thereby recursively creating a hierarchy of virtual presentities.

* * * * *